United States Patent [19]

Stasse

[11] 3,955,485
[45] May 11, 1976

[54] COFFEE MAKING MACHINE

[76] Inventor: Roland Stasse, 14 Avenue Dufourmantel, 06 Nice, France

[22] Filed: Oct. 4, 1974

[21] Appl. No.: 512,343

[30] Foreign Application Priority Data
Oct. 5, 1973 France .............................. 73.36107

[52] U.S. Cl. .................................. 99/287; 99/351
[51] Int. Cl.² .................................. A47J 31/00
[58] Field of Search ............... 99/279, 282–283, 99/287, 351; 74/527, 531; 188/164; 335/209, 225, 291

[56] References Cited
UNITED STATES PATENTS

| | | | |
|---|---|---|---|
| 3,020,162 | 2/1962 | Cunningham et al. | 99/351 X |
| 3,371,591 | 3/1968 | Vandenburgh | 99/287 X |
| 3,454,838 | 7/1969 | Defain | 335/209 X |
| 3,507,368 | 4/1970 | Durant | 188/164 |
| 3,556,270 | 1/1971 | Comment | 74/531 X |
| 3,691,933 | 9/1972 | Martin | 99/282 |
| 3,754,462 | 8/1973 | Brill | 99/287 |

*Primary Examiner*—Robert W. Jenkins
*Assistant Examiner*—Arthur O. Henderson
*Attorney, Agent, or Firm*—William A. Drucker

[57] ABSTRACT

In a coffee making machine having a support structure and a pressure lever pivoted thereon, a device to obtain regular pressure on ground coffee, irrespective of its volume and to stabilise said pressure lever in "up" and "down" positions, comprising an electromagnet mounted in the support structure, a mild steel plate integral with the lever, said plate being movable parallel to the electromagnet and being lockable by attraction when the electromagnet is energised.

3 Claims, 2 Drawing Figures

U.S. Patent   May 11, 1976   3,955,485
FIG.1
FIG.2
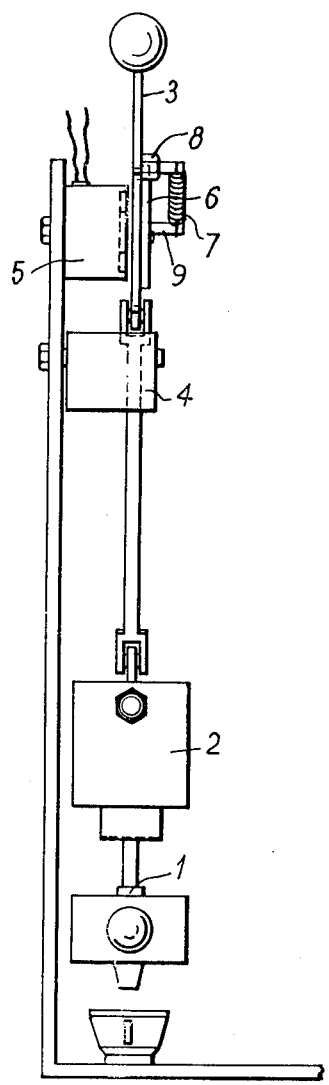
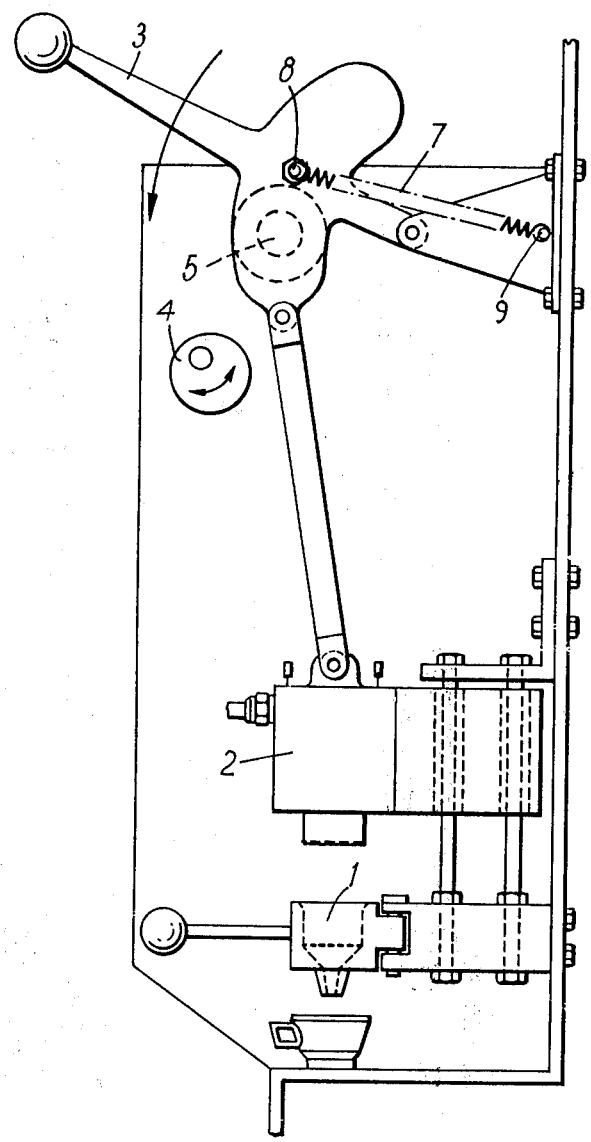

COFFEE MAKING MACHINE

The present invention relates to a device to obtain even pressure on ground coffee, irrespective of volume, in coffee machine filters.

In known devices, pressure on the ground coffee or prepacks is obtained while infusion lasts by means of eccentric jacks or cams, hydraulically or mechanically controlled by an electric motor.

This pressure is constant and even, irrespective of the volume of ground coffee in the filter, and the effect when the pressure of the water used for the infusion is produced by an electric pump controlled by an adjustable or non-adjustable timing mechanism, is never to produce an infusion of even quality.

The device of the present invention overcomes these disadvantages and makes it possible to keep the ground coffee compressed at an even pressure during the infusion time so as to obtain an optimum quantity of infusion, irrespective of the amount of coffee contained in the filter.

The invention comprises in combination a carrier electromagnet in front of which there moves in parallel a mild steel plate which is locked by attraction when the electromagnet is live, and a spring fixed on the mild steel plate on the opposite side to the carrier electromagnet, which will lift the plate so that the latter does not remain in contact with the carrier electromagnet while the lever is operated, thus avoiding any wear on the two parts.

In the accompanying drawings, which show a non-limiting embodiment of the invention:

FIG. 1 shows the device seen in elevation and from the front;

FIG. 2 shows the same object seen in elevation and from the side.

Ground coffee contained in a coffee filter 1 (FIGS. 1 and 2) positioned under a boiler 2 is manually compressed to the required pressure by a lever 3. For this purpose, the user, according to whether he wants to obtain stronger or weaker coffee, adjusts the travel of the lever by means of a stop 4. The travel of the lever 3 is thereby limited or increased, as the case may be.

The compacting of the ground coffee on which the quality of the infusion depends is obtained manually by use of the lever 3, and the selected pressure is maintained by locking of the lever 3 by a carrier electromagnet 5 in front of which there moves in parallel a mild steel plate 6 fixed to the lever 3. This mild steel plate 6, during infusion, is attracted against the carrier electromagnet 5, which is live, and thus keeps the ground coffee compressed between the filter and the boiler during the infusion time.

When the current is switched off, a spring 7 fixed on the opposite side of the mild steel plate 6 from the carrier electromagnet 5 lifts this plate 6 away from the carrier electromagnet 5. The resultant spacing makes it possible, when the lever 3 is operated, to break the contact between the mild steel plate and the carrier electromagnet in order to prevent premature wear on the two parts.

The spring 7 is fixed at point 9 in such a way that when the lever 3 moves, it can exert a pull to maintain said lever in the up or down position according to its terminal position in the two directions.

I claim:

1. In a coffee making machine having a support structure and a manually-operable pressure lever to maintain pressure on the ground coffee pivoted on said support structure for rotation about an axis between a rest position and a pressure-applying position, the improvement which comprises, in combination: means to hold said lever in selected position and comprising, an electromagnet positioned adjacent to said pressure lever, and a magnetic-metal plate on said lever, said plate being so positioned in relation to the electromagnet and of such length that a portion of the plate is adjacent to the electromagnet in all positions of pivoting of the lever, whereby upon energising of the electromagnet the plate is caused to adhere magnetically to the electromagnet and frictionally retain the lever in a selected position.

2. In a coffee making machine, as claimed in claim 1, said pressure lever being swingable laterally with respect to the plane in which it pivots, thereby to permit movement of the plate into and out of contact with the electromagnet, and spring means coupled to said lever and to said support structure and positioned to urge said plate away from electromagnet.

3. In a coffee making machine, as claimed in claim 2, said spring means being connected to said plate and to said support structure at positions which, in a central position of pivotal movement of the pressure lever, are aligned with the axis of rotation of the lever, whereby said spring means urge said pressure lever towards each of its end positions of pivotal movement.

* * * * *